(12) United States Patent
Namenson

(10) Patent No.: US 12,089,608 B2
(45) Date of Patent: Sep. 17, 2024

(54) METHOD OF PREPARING A FOOD PRODUCT

(71) Applicant: Organic Living Superfoods, LLC, Walpole, MA (US)

(72) Inventor: Bruce Namenson, Walpole, MA (US)

(73) Assignee: HEALTHY TRUTH LLC, Walpole, MA (US)

(*) Notice: Subject to any disclaimer, the term of this patent is extended or adjusted under 35 U.S.C. 154(b) by 488 days.

(21) Appl. No.: 16/272,124

(22) Filed: Feb. 11, 2019

(65) Prior Publication Data

US 2019/0246659 A1    Aug. 15, 2019

Related U.S. Application Data

(60) Provisional application No. 62/628,456, filed on Feb. 9, 2018.

(51) Int. Cl.
| | |
|---|---|
| A23B 9/08 | (2006.01) |
| A23L 3/00 | (2006.01) |
| A23L 3/40 | (2006.01) |
| A23L 11/00 | (2021.01) |
| A23L 19/00 | (2016.01) |
| A23N 12/08 | (2006.01) |

(52) U.S. Cl.
CPC ............ *A23B 9/08* (2013.01); *A23L 3/001* (2013.01); *A23L 3/40* (2013.01); *A23L 11/01* (2016.08); *A23L 19/03* (2016.08); *A23N 12/08* (2013.01); *A23V 2002/00* (2013.01)

(58) Field of Classification Search
CPC ............ A23B 9/08; A23L 11/01; A23L 19/03; A23L 3/001; A23L 3/40; A23N 12/08; A23V 2002/00
See application file for complete search history.

(56) References Cited

U.S. PATENT DOCUMENTS

| | | | | |
|---|---|---|---|---|
| 3,943,842 A | * | 3/1976 | Bills | ......................... A23L 3/00 |
| | | | | 99/473 |
| 4,192,081 A | * | 3/1980 | Erickson | ................ G08G 1/095 |
| | | | | 34/233 |
| 4,465,696 A | | 8/1984 | Strahl | |
| 5,487,894 A | | 1/1996 | Kovacs | |

(Continued)

OTHER PUBLICATIONS

Cormier, Jordyn. "This Superfood had Super Healing Properties" Oct. 19, 2016 https://www.ecowatch.com/sprouts-superfood-healing-properties-2053851592.html (Year: 2016).*

(Continued)

*Primary Examiner* — Katherine D Leblanc
(74) *Attorney, Agent, or Firm* — Onello & Mello, LLP

(57) ABSTRACT

Provided is a method of making a dehydrated food product. The method includes culling the food product for foreign objects, cleaning the food product, germinating the food product, dehydrating the food product, and cooling the dehydrated food product. Dehydrating the food product can include maintaining the food product in a compartment, heating air in the compartment to a temperature at or between about 115° F. and about 118° F. to remove moisture from the food product, and venting the heated air and moisture from the compartment. The food product can be, as examples, nuts, seeds, and/or beans.

19 Claims, 2 Drawing Sheets

(56) References Cited

U.S. PATENT DOCUMENTS

| | | | |
|---|---|---|---|
| 6,210,734 B1 | 4/2001 | Jun | |
| 7,022,369 B1 | 4/2006 | Kleinman | |
| 8,044,260 B2 * | 10/2011 | Dersch | C12N 15/8201 |
| | | | 800/278 |
| 2004/0077090 A1 * | 4/2004 | Short | G01N 33/6818 |
| | | | 506/1 |
| 2013/0233185 A1 * | 9/2013 | Hunt | A23L 3/40 |
| | | | 99/476 |

OTHER PUBLICATIONS

"Sprouting Basics" Jul. 6, 2012 http://dehydratingwaybeyondjerky.blogspot.com/2012/07/sprouting-basics.html (Year: 2012).*

"How to Make Sprouted Candied Nuts & Seeds:: Sprouted for Better Digestion & Nourishment:: Made With Real Food Sweeteners & Junk!" Oct. 28, 2017 https://www.raisinggenerationnourished.com/2017/10/how-to-make-sprouted-candied-nuts-seeds/ (Year: 2017).*

Prakash, Sheela. "How to Store Nuts and Seeds" Sep. 17, 2014. https://food52.com/blog/11275-how-to-store-nuts-and-seeds (Year: 2014).*

USDA Table of Nutrient Retention Factors, USDA, Dec. 2007, http://www.ars.usda.gov/nutrientdata.

* cited by examiner

METHOD OF PREPARING A FOOD PRODUCT

CROSS REFERENCE TO RELATED APPLICATIONS

The present application claims priority under 35 USC 119(e) to U.S. Provisional Patent Application Ser. No. 62/628,456, entitled "METHOD OF PREPARING A FOOD PRODUCT," filed Feb. 9, 2018, which is incorporated herein by reference in its entirety.

FIELD OF INTEREST

The present inventive concepts relate to the field of nutritional food products, and more specifically to a method that processes plain nuts and seeds and makes them more nutritional, assimilable, and their nutrients more bioavailable. This is accomplished with soaking, germinating, sprouting, and dehydrating techniques that increase the nutritional value, but do not destroy important nutrients with excessive heat.

BACKGROUND

The processing of various foods for consumption has typically involved "cooking." Methods of cooking include roasting, baking, boiling, frying, steaming, and smoking. Some of these methods essentially rely on moisture, such as boiling and steaming.

While cooking may be a quick and effective way to prepare many foods for consumption, this process can adversely modify the nutritional value of different food products. For example, the United States Department of Agriculture (USDA) issued a report entitled *USDA Table of Nutrient Retention Factors* (Release 6, dated December 2007) that showed that roasted nuts retained only 80% of Phosphorus (P), 80% of Vitamin C, and 80% of Folic Acid, as compared to the pre-cooked nutritional values. Other losses were also observed.

U.S. Pat. No. 7,022,369 (the "'369 patent") describes a process for "full cooking" by roasting grains, nuts, seeds, and legumes to make them more digestible and of high nutritional content. According to the '369 patent, selected grains are initially cleaned and germinated, and then rinsed, soaked, drained, and rinsed again, before a final cleaning/germination step. The grains are the soaked with an anti-mold additive and then drained and rinsed again. Once prepared in this manner, "the processed and germinated product is subjected to a roasting, full-cooking step 21 at or within a temperature range of 215° Fahrenheit to 320° Fahrenheit by dry roasting in which warm air completely surrounds and also serves as a drying environment for the product . . . ." After testing, the product is tested for mold proliferation and, if cleared, packages for distribution. While the process, which essentially includes "cooking," is intended to enhance nutrients, "cooking" the food naturally decreases the retention of certain nutrients, according to the USDA.

There is a need for an improved method of food preparation, other than cooking, that retains a substantial amount of the food's nutritional value, where nutrients are assimilable and more bioavailable.

SUMMARY

In accordance with one aspect of the present disclosure, provided is a method of making a dehydrated food product. The steps comprise culling the food product for foreign objects, cleaning the food product, germinating the food product, dehydrating the food product, and cooling the dehydrated food product. Dehydrating the food product can include maintaining the food product in a compartment, heating air in the compartment to a temperature at or between about 115° F. and about 118° F. to remove moisture from the food product, and venting the heated air and moisture from the compartment.

In various embodiments, the food product is one or more nuts.

In various embodiments, the food product is one or more seeds.

In various embodiments, the method further comprises testing the dehydrated food product to determine a level of anti-nutrient content.

In various embodiments, cooling the dehydrated food product includes cooling the dehydrated food product in a container having at least one opening covered by at least one screen and/or filter.

In various embodiments, the container has at least one opening covered by at least one screen and/or filter at a top of the container.

In various embodiments, heating the food product includes heating the food product for at least about 24 hours.

In various embodiments, heating the food product includes heating the food product for up to about 48 hours.

In various embodiments, the compartment forms part of a dehydrator apparatus comprising a heating element and a fan configured to move heated air through the compartment.

In various embodiments, the dehydrator apparatus further comprises at least one humidity sensor, and the method further comprises sensing a humidity level in the compartment.

In various embodiments, the method further comprises determining if the humidity level is at, above, and/or below a threshold humidity level.

In various embodiments, the method further comprises generating an alert if a sensed humidity level is at and/or below the threshold humidity level.

In various embodiments, the method further comprises automatically turning the heating element off if the sensed humidity level is at or below the threshold humidity level and/or automatically turning the fan off if the sensed humidity level is at or below the threshold humidity level.

In various embodiments, the method further comprises automatically turning the heating element on if the sensed humidity level is above the threshold humidity level and/or automatically turning the fan on if the sensed humidity level is above the threshold humidity level.

In various embodiments, the method further comprises automatically turning on and/or off the heating element and/or the fan in response to the sensed humidity level.

In accordance with another aspect of the present disclosure, provided is a method of preparing a food product. The method includes culling the food product for foreign objects, cleaning and germinating the food product, dehydrating the food product, and cooling the dehydrated food product. Cleaning and germinating the food product can include rinsing the food product, soaking the food product, draining the food product, and again rinsing the food product. Dehydrating the food product can include maintaining the food product in a compartment, heating air in the compartment to a temperature at or between about 115° F. and about 118° F. to remove moisture from the food product, and venting the heated air and moisture from the compartment.

In various embodiments, the food product is one or more nuts, seeds, and/or beans.

In various embodiments, the method further comprises testing the dehydrated food product to determine a level of anti-nutrient content.

In various embodiments, cooling the dehydrated food product includes cooling the dehydrated food product in a container having at least one opening covered by at least one screen and/or filter.

In various embodiments, the container has at least one opening covered by at least one screen and/or filter at a top of the container.

In various embodiments, heating the food product includes heating the food product for at least about 24 hours.

In various embodiments, heating the food product includes heating the food product for up to about 48 hours.

In various embodiments, the compartment forms part of a dehydrator apparatus comprising a heating element and a fan configured to move heated air through the compartment.

In various embodiments, the dehydrator apparatus further comprises at least one humidity sensor, and the method further comprises sensing a humidity level in the compartment.

In various embodiments, the method further comprises determining if the humidity level is at, above, and/or below a threshold humidity level.

In various embodiments, method further comprises generating an alert if a sensed humidity level is at and/or below the threshold humidity level.

In various embodiments, the method further comprises automatically turning the heating element off if the sensed humidity level is at or below the threshold humidity level and/or automatically turning the fan off if the sensed humidity level is at or below the threshold humidity level.

In various embodiments, the method further comprises automatically turning the heating element on if the sensed humidity level is above the threshold humidity level and/or automatically turning the fan on if the sensed humidity level is above the threshold humidity level.

In various embodiments, the method further comprises automatically turning on and/or off the heating element and/or the fan in response to the sensed humidity level.

In accordance with another aspect of the present disclosure, provided is a method of dehydrating food, as shown and described.

In accordance with another aspect of the present disclosure, provided is a food dehydrator, as shown and described.

In accordance with another aspect of the present disclosure, provided is a method of making a dehydrated food product. The steps comprise maintaining the food product in a compartment, heating air in the compartment to a temperature at or between about 115° F. and about 118° F. to remove moisture from the food product, and venting the heated air and moisture from the compartment.

In various embodiments, the food product is a germinating food product.

In accordance with another aspect of the present disclosure, provided is a method of making a dehydrated food product. The steps comprise culling the food product for foreign objects, cleaning the food product, germinating the food product, dehydrating the food product, and cooling the dehydrated food product. Dehydrating the food product can include maintaining the food product in a compartment, heating air in the compartment to remove moisture from the food product, and venting the heated air and moisture from the compartment.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1:
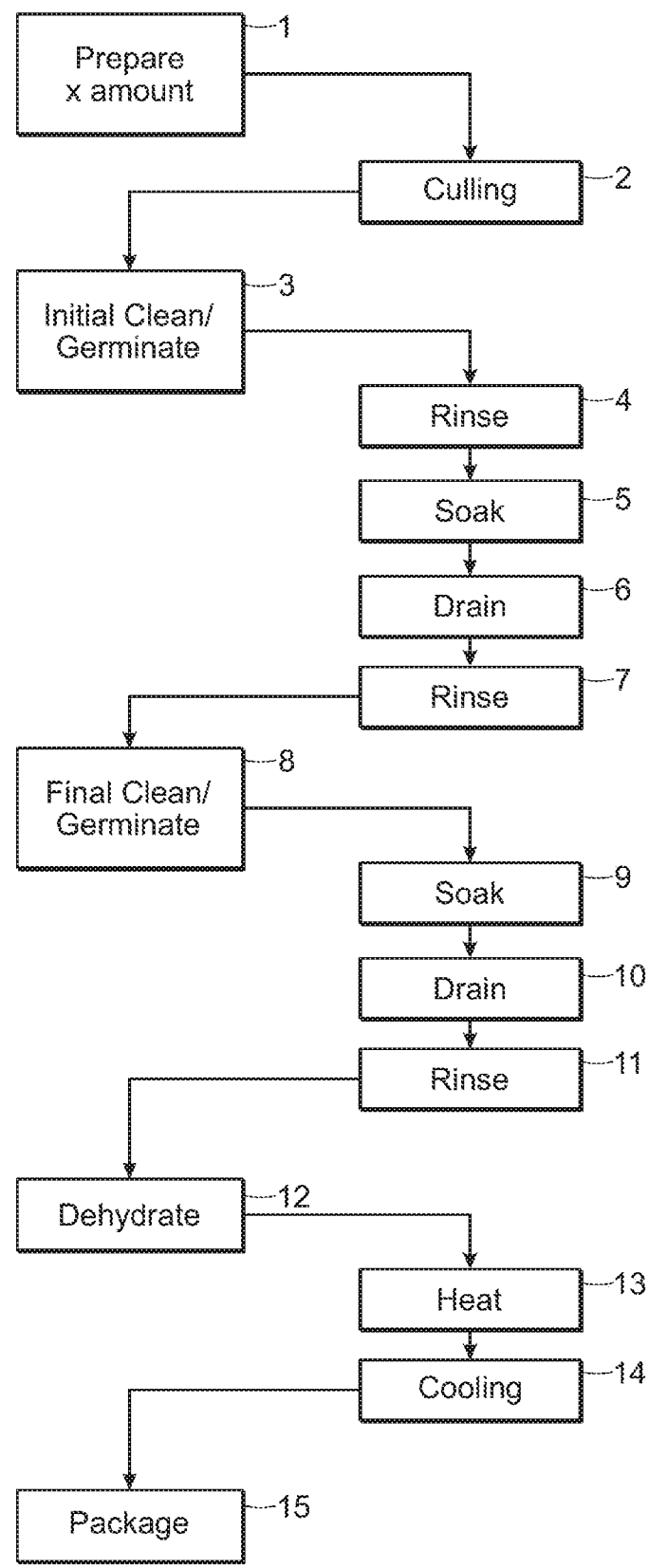
FIG. 1 is a block diagram of a method of producing a food product 22 in accordance with embodiments of the present inventive concepts.

Various aspects of the inventive concepts will be described more fully hereinafter with reference to the accompanying drawings, in which some exemplary embodiments are shown. The present inventive concepts may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein, but are to include deviations in shapes that result, for example, from manufacturing. Thus, the regions illustrated in the figures are schematic in nature and their shapes are not intended to illustrate the actual shape of a region of a device and are not intended to limit the scope of the present inventive concepts.

To the extent that functional features, operations, and/or steps are described herein, or otherwise understood to be included within various embodiments of the inventive concepts, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

FIG. 1 is a block diagram of an embodiment of a method of preparing a food product 22 in accordance with aspects of the inventive concepts. In some embodiments, a first step is to prepare 1 a quantity of the food product 22. In some embodiments, the food product 22 is one or more nuts and/or seeds. In some embodiments, the types of nut and/or seed are selected from a group that includes, but is not limited to, almonds, cashews, pecans, walnuts, sunflower seeds, pumpkin seeds, etc. The particular quantity of food product can vary in different embodiments. That is, the method can be scaled up or down to accommodate a variety of quantities.

In some embodiments, the food product 22 may be culled 2 for foreign objects and other undesirable substances before an initial cleaning/germinating step 3. In some embodiments, the initial cleaning/germinating step may include rinsing 4 and soaking 5 the food product 22, followed by draining 6 the food product 22 and a second rinsing 7. In some embodiments, soaking and sprouting the food product 22, e.g., nuts and seeds, can be used to accomplish the germinating portion of step 3. The culling 2 and initial cleaning 3 steps are designed to remove undesirable foreign objects or substances that may be harmful to the consumer of the food product 22. In some embodiments, a final cleaning/germinating step 8 is performed, which may entail further soaking 9, draining 10, and a final rinse 11.

In some embodiments, once the food product 22 has been cleaned and germinated, the food product 22 is spread on trays and dehydrated 12 by exposure to air that is at or within a selected temperature range. In a preferred in embodiment, the selected temperature range is about 115° Fahrenheit to about 118° Fahrenheit (e.g., plus or minus 2° Fahrenheit).

Dehydration, in food processing, is a manner by which many types of food can be preserved for indefinite periods by extracting the moisture, thereby inhibiting the growth of microorganisms. Dehydration, therefore, is also referred to as "food drying." Drying inhibits the growth of bacteria, yeasts, and mold through the removal of water. Dehydration is fundamentally different from cooking in that cooking is done at higher temperatures and is generally not intended to remove moisture. In fact, many types of cooking essentially include moisture, e.g., boiling and steaming. In fact, some types of cooking use high heat, much higher than 120° Fahrenheit, to lock in moisture, e.g., in cooking meats. Those skilled in the art, therefore, appreciate fundamental differences between cooking and dehydration (removing moisture).

To dry foods successfully, it is generally considered that one needs low humidity, a source of low heat, and air circulation. Dehydration can be accomplished by different methods, which include use of dehydrators, oven drying, sun drying, air drying, and microwave drying.

In one embodiment, the dehydration process is one in which warm air fills a dehydration compartment 25 of a dehydrator apparatus 21 (FIG. 2) and heats the food product 22 without cooking it. In some embodiments, the dehydration step 12 includes heating 13 in the dehydrator apparatus 21 for approximately 24 to 48 hours at an average temperature that is at or between about 115° Fahrenheit to about 118° Fahrenheit. Thus, in some embodiments, during the heating 13 step, the air in the dehydrator apparatus may have an average temperature that is at or between about 115° Fahrenheit to about 118° Fahrenheit. In some embodiments, after the heating step 13, the food product 22 is removed from the dehydrator apparatus 21.

In some embodiments, the heating step 13 is followed by a cooling step 14, during which the food product 22 cools. The cooling step 14 can involve allowing the food product 22 to naturally cool, e.g., at ambient temperature. In other embodiments, the cooling step 14 can include maintaining the dehydrated food product in a refrigerated environment, e.g., above the freezing temperature and below ambient temperature. Additionally, or alternatively, in some embodiments, the cooling step 14 can include maintaining the dehydrated food product in an environment at or below the freezing temperature.

In some embodiments, the cooling step 14 can involve maintaining the dehydrated food product in an open container having a portion covered by a screen or filter to allow evacuation of moisture and dissipation of heat, while preventing or otherwise mitigating contamination from any foreign objects or potential contaminants. For example, in one embodiment, the container can have a top at least partially covered by at least one screen or filter. In some embodiments, one or more sides of the container can be at least partially covered by at least one screen or filter. In some embodiments, opposite sides of the container can include at least one screen or filter to accommodate evacuation of moisture and dissipation of heat, which can optionally be aided by at least one crosswise airflow from one side to the other.

Optionally, the dehydrated food product 22 can be tested to determine the level of anti-nutrient content, or nutrient retention, and microorganisms, mold, etc. After the cooling step 14 and the testing step, if performed, the dehydrated food product can be packaged 15 for distribution and use.

Figure 2:
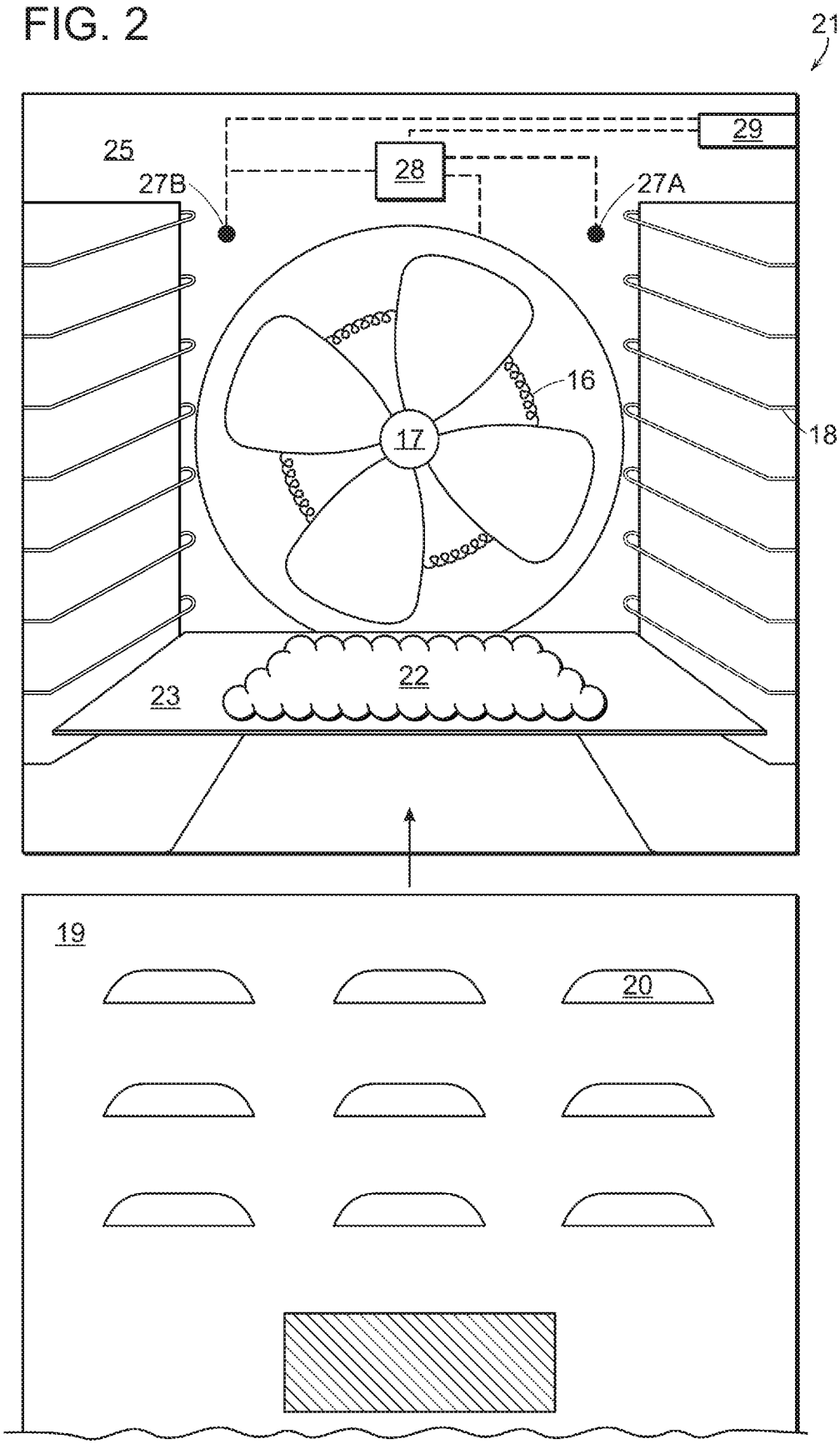
FIG. 2 is a front view of a dehydrator apparatus 21 and a dehydrator cover 19 in accordance with embodiments of the present inventive concepts.

FIG. 2 is a front view of an embodiment of a dehydrator apparatus 21 in accordance with aspects of the inventive concepts. In some embodiments, the dehydrator apparatus 21 comprises a dehydration compartment 25 within which the food product 22 is maintained for dehydration. The dehydrator apparatus 21 includes a heating element 16, such as a heating coil, that heats the compartment 25 to a specified temperature to thereby heat the surrounding air therein. In some embodiments, a fan 17 can be used to blow or draw the heated air through or across the compartment 25. After the final rinse 11 step, the food product 22 may be spread on trays 23 and placed or moved into the compartment 25 of the dehydrator apparatus 21. In some embodiments, the trays 23 sit on one or more rails or guides 18. The one or more trays 23 may be spaced apart, according to positioning of the rails or guides 18, to allow for substantial air flow between the trays 23.

The dehydrator apparatus 21 can include a dehydrator cover 19, which covers the compartment 25. In some embodiments, the dehydrator cover 19 is placed on the front of the dehydrator apparatus 21. In some embodiments, the dehydrator cover 19 may have one or more vents 20 that allow hot air and moisture to escape the dehydrator compartment 25. In some embodiments, the dehydrated food product can be left in the dehydrator apparatus 21 for 24 to 48 hours, e.g., at a temperature in a range of 115° F. to 118° F. The time can vary depending on the food product.

In some embodiments, the dehydrator apparatus 21 can include at least one temperature sensor 27A. The temperature sensor can be configured to sense the temperature in the compartment 25. The temperature sensor 27A can form part of a feedback loop that maintains the temperature in the compartment at a selected (or set) temperature and/or within a selected temperature range, e.g., in a temperature range of 115° F. to 118° F.

In some embodiments, one or more humidity sensors 27B can also be included in the compartment 25 to sense the humidity therein. In such embodiments, a threshold humidity level can be established, where a humidity at or below the humidity threshold can be used as a trigger to automatically turn off the heating element 16 and/or fan 17 and/or a humidity above the humidity threshold can be used as a trigger to automatically turn on the heating element 16 and/or fan 17.

In such embodiments, the dehydrator apparatus 21 can include a controller 28, which can include a processor. The controller 28 can be operatively coupled to the temperature sensor 27A and/or the humidity sensor 27B, as well as the heating element 16 and/or the fan 17 and provide automatic control thereof based on the sensed temperature and/or humidity level. For instance, in some embodiments, the controller 28 can be configured to turn on/off the heating element 16 and/or fan 17 to maintain the selected temperature in the compartment until the humidity sensor 27B senses that the humidity level has lowered to the threshold humidity level.

Additionally, or alternatively, the humidity sensor 27B can be operatively coupled to an alert device 29. The humidity sensor(s) 27B can be directly coupled to the alert device 29 or coupled via the controller 28. The alert device 29 can be configured to automatically generate an audible alert, a visual alert, and/or an electronic alert. Examples of electronic alerts can be an email, a text message, an electrical, mechanical, and/or optical signal generated for use by another system, subsystem or functional element. The alert device 29 can automatically communicate one or more alerts via one or more wired or wireless communication technologies, or combinations thereof. Wireless communication technologies can include, but are not limited to, Bluetooth and cellular technologies. The particular technologies used for alerts can be or include any type of communication path now known or hereafter developed.

The couplings between the various functional elements, in this embodiment, are represented in dashed lines in FIG. 2. Such couplings can be electrical, mechanical, optical, or combinations thereof, or any other type of couplings now known or hereafter developed.

While the foregoing has described what are considered to be the best mode and/or other preferred embodiments, it is understood that various modifications can be made therein and that the inventive concepts may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provided in combination in a single embodiment. Conversely, various features of the inventive concepts which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A method of making a dehydrated food product, comprising:
   culling nuts and/or seeds to remove foreign objects;
   performing at least two cleaning/germinating steps without sprouting the nuts and/or seeds, each cleaning/germinating step comprising rinsing, soaking, and then draining the nuts and/or seeds;
   dehydrating the nuts and/or seeds to form dehydrated nuts and/or seeds without sprouts by a method comprising:
      maintaining the nuts and/or seeds in a compartment;
      heating air in the compartment to a temperature in a range of about 115° F. to about 120° F. for at least about 24 hours to remove moisture from the nuts and/or seeds;
      venting the heated air and moisture from the compartment; and
      removing the nuts and/or seeds from the compartment and cooling the nuts and/or seeds at a temperature below an ambient temperature in a container having at least one opening covered by at least one screen and/or filter to form the dehydrated nuts and/or seeds without sprouts.

2. The method of claim 1, wherein the method further comprises:
   testing the dehydrated nuts and/or seeds to determine a level of anti-nutrient content.

3. The method of claim 1, wherein the container has the at least one opening covered by at least one screen and/or filter at a top of the container.

4. The method of claim 1, wherein heating the nuts and/or seeds includes heating the nuts and/or seeds for up to 48 hours.

5. The method of claim 1, wherein the compartment forms part of a dehydrator apparatus comprising a heating element and a fan configured to move heated air through the compartment and evacuate at least some of the moisture.

6. The method of claim 5, wherein the dehydrator apparatus further comprises at least one humidity sensor, and the method further comprises:
   sensing a humidity level in the compartment;
   determining if the humidity level is at, above, or below a threshold humidity level.

7. The method of claim 6, further comprising:
automatically turning the heating element off if the sensed humidity level is at or below the threshold humidity level; and/or
automatically turning the fan off if the sensed humidity level is at or below the threshold humidity level.

8. The method of claim 6, further comprising:
automatically turning the heating element on if the sensed humidity level is above the threshold humidity level; and/or
automatically turning the fan on if the sensed humidity level is above the threshold humidity level.

9. The method of claim 6, further comprising:
generating an alert if a sensed humidity level is at or below the threshold humidity level.

10. A method of preparing a dehydrated food product, comprising:
culling one or more nuts and/or seeds to remove foreign objects;
performing an initial cleaning/germinating step comprising:
rinsing the one or more nuts and/or seeds;
soaking the one or more nuts and/or seeds;
draining the one or more nuts and/or seeds;
rinsing the one or more nuts and/or seeds;
performing a final cleaning/germinating step comprising:
soaking the one or more nuts and/or seeds;
draining the one or more nuts and/or seeds;
rinsing the one or more nuts and/or seeds,
the initial and final cleaning/germinating steps performed without sprouting the one or more nuts and/or seeds;
dehydrating the one or more nuts and/or seeds without sprouts to form dehydrated nuts and/or seeds without sprouts, by a method comprising:
maintaining the one or more nuts and/or seeds in a compartment of a dehydrator;
heating air in the compartment to a temperature in a range of about 115° F. to about 120° F. for at least approximately 24 hours;
venting the heated air and moisture from the compartment; and
removing the one or more nuts and/or seeds without sprouts from the compartment and cooling below ambient temperature in a container having at least one opening covered by at least one screen and/or filter to form the dehydrated one or more nuts and/or seeds.

11. The method of claim 10, wherein the method further comprises:
testing the one or more nuts and/or seeds to determine a level of anti-nutrient content.

12. The method of claim 10, wherein the method further includes, after cooling the dehydrated one or more nuts and/or seeds, packaging the dehydrated one or more nuts and/or seeds.

13. The method of claim 10, wherein heating the one or more nuts and/or seeds includes heating the one or more nuts and/or seeds for up to 48 hours.

14. The method of claim 10, wherein the dehydrator comprises a heating element and a fan configured to move heated air through the compartment and evacuate at least some of the moisture.

15. The method of claim 14, wherein the dehydrator apparatus further comprises at least one humidity sensor, and the method further comprises:
sensing a humidity level in the compartment.

16. The method of claim 15, further comprising:
determining if the humidity level is at, above, and/or below a threshold humidity level; and
generating an alert if a sensed humidity level is at and/or below the threshold humidity level; and/or
automatically turning the heating element off if the sensed humidity level is at or below the threshold humidity level; and/or
automatically turning the fan off if the sensed humidity level is at or below the threshold humidity level.

17. A method of making a dehydrated food product, comprising:
performing a plurality of cleaning/germinating steps, each comprising rinsing, soaking, and
draining nuts and/or seeds without sprouting the nuts and/or seeds;
dehydrating the nuts and/or seeds by heating air in a dehydrator comprising the nuts and/or seeds to a temperature in a range of about 115° F. to about 120° F. for at least about 24 hours to remove moisture from the nuts and/or seeds, including venting at least some of the moisture from the dehydrator; and
removing the nuts and/or seeds from the dehydrator and cooling the nuts and/or seeds at a temperature below an ambient temperature in a container having at least one opening covered by at least one screen and/or filter to form the dehydrated nuts and/or seeds without sprouts.

18. The method of claim 17, wherein dehydrating the nuts and/or seeds includes heating the nuts and/or seeds without cooking the nuts and/or seeds.

19. The method of claim 17, wherein cooling the nuts and/or seeds includes cooling the nuts and/or seeds to a temperature at or below a freezing temperature.

* * * * *